United States Patent [19]

Reusche et al.

[11] Patent Number: 5,235,161
[45] Date of Patent: Aug. 10, 1993

[54] DETACHABLE METALLIC SAFETY GUARD FOR PORTABLE ELECTRIC IMMERSION HEATER

[75] Inventors: Donald W. Reusche, St. Charles; Thomas K. Reusche, Geneva, both of Ill.

[73] Assignee: Allied Precision Industries, Inc., Geneva, Ill.

[21] Appl. No.: 213,588

[22] Filed: Jun. 30, 1988

[51] Int. Cl.[5] .......................... H05B 3/80; F24H 1/22
[52] U.S. Cl. ........................ 219/523; 219/532; 219/533; 219/536; 219/542; 392/447; 392/499
[58] Field of Search .............. 219/310, 312, 316–322, 219/327–338, 523, 536, 542, 544, 403, 541, 533, 523; 338/238–243, 320, 321; 392/447, 499, 497

[56] References Cited

U.S. PATENT DOCUMENTS

| 800,084 | 9/1905 | Dice | 219/541 R |
|---|---|---|---|
| 887,923 | 5/1908 | Crandell | 219/523 |
| 1,240,771 | 9/1917 | Parkhurst | 338/243 |
| 1,483,564 | 2/1924 | Wickes et al. | 219/523 X |
| 1,560,695 | 11/1925 | Kiger | 219/523 X |
| 1,676,510 | 7/1928 | Ramey et al. | 219/523 X |
| 2,278,994 | 4/1942 | Kempton | 392/447 X |
| 2,428,732 | 10/1947 | Adams | 219/523 |
| 2,520,576 | 8/1950 | Stookey | 392/499 |
| 2,877,332 | 3/1959 | Senior | 219/533 |
| 2,888,547 | 5/1959 | Saper | 219/523 |
| 3,476,915 | 11/1969 | Rapsis | 219/541 X |
| 3,555,242 | 1/1971 | Jenkins | 219/335 |
| 3,673,386 | 6/1972 | Drugmand et al. | 219/523 |
| 4,110,603 | 8/1978 | Peterson et al. | 219/531 X |
| 4,835,366 | 5/1989 | Owen et al. | 219/523 X |

FOREIGN PATENT DOCUMENTS

| 233545 | 4/1961 | Australia | 219/403 |
|---|---|---|---|
| 508810 | 7/1939 | United Kingdom | 219/316 |
| 1222771 | 2/1971 | United Kingdom | 392/499 |
| 1592965 | 7/1981 | United Kingdom | 219/523 |

Primary Examiner—Anthony Bartis
Attorney, Agent, or Firm—Allegretti & Witcoff, Ltd.

[57] ABSTRACT

A detachable metallic safety guard for use with a portable electric immersion heater is formed as an endless metallic band defining an open central area for receiving the heating element of the heater with the inner periphery of the band in spaced surrounding relationship to the heating element. The vertical height of the band is greater than the height of the heating element and the band is provided with openings allowing fluid to circulate therethrough. The guard is adapted to be directly attached to the heating element by a pair of clips carried by a diametric crossbar secured at its ends to the band. The band includes at least two tabs extending radially inwardly for providing peripheral support for the heating element. The heater may be a portable floating heater.

5 Claims, 1 Drawing Sheet

DETACHABLE METALLIC SAFETY GUARD FOR PORTABLE ELECTRIC IMMERSION HEATER

FIELD OF THE INVENTION

This invention relates generally to portable heaters. More particularly, the invention concerns a detachable safety guard for use with a portable immersion heating device. Still more particularly, the invention relates to a detachable safety guard that provides protection for the heating element while improving the heat transfer efficiency of portable electric water heaters when utilized to prevent a body of water from freezing.

PRIOR ART

Portable electric immersion water heaters fall into two categories, submerged and floating. The possible uses of such heaters are diverse. Floating heaters, however, have their greatest utility as heaters for livestock watering tanks. Livestock require large amounts of water throughout the year. In order to provide livestock with needed water during the winter months exterior water tanks are seasonally equipped with electric water heaters to prevent the water contained therein from icing over during temperatures below freezing.

Although the use of guards on submerged heaters is well known to the art, it has heretofore not been recognized that guards were needed for floating heaters. This need was not previously recognized because there was no danger of damaging metal watering tanks. However, the relatively recent introduction of nonmetallic watering tanks has now created the need for a means of protection against the possibility of contact of the hot heating element of an electric heater with the nonmetallic tank wall. Thus, the substitution or replacement of metal tanks with tanks constructed of rubber, plastic, structural foam, or like materials has made the likelihood of structural damage from electric water heaters of some concern.

As mentioned, guards have been previously used exclusively with submerged heaters. For example, U.S. Pat. No. 2,429,303 (Apatow) discloses an immersion heater having an open ended aluminum tubular casing with a plurality of effluxive apertures. The upper end of this tubular casing is closed with a screw cap and the diameter of the tubular casing is many times smaller in dimension than the vertical length of the casing. The heating element is supported by plates and is indirectly connected to the tubular casing. Likewise, U.S. Pat. Nos. 2,691,089 (Blais) and 2,899,533 (Farmer) both disclose submerged heaters having cylindrical housings with perforations. Both housings are characterized by having only one end opened, having a diameter much smaller in dimension than the vertical length of the housing, and not being in direct contact with the heating element.

In summary then, the prior art is concerned only with housings designed for use with submerged heaters and these housings are characterized by diameters much smaller in dimension than the vertical length. Further, the housings of the prior art heaters are not in direct contact with the heating element of the heater and, as such, cannot function to provide additional heat transfer area. Moreover, the art has not recognized the need for safety guards for use with floating electric water heaters designed for use in nonmetallic water tanks.

SUMMARY OF THE INVENTION

The present invention relates to a safety guard to be used in conjunction with a portable electric water heater.

It is an object of this invention to provide a safety device that prevents damage to nonmetallic water tanks.

Another object of this invention is to provide a safety device that may increase the heat transfer efficiency of electric water heaters whether floating or submerged.

Yet another object is to provide a device that is readily detachable from a portable electric water heater to facilitate easy cleaning and maintenance and to permit retrofitting to water heaters now on the market.

Accordingly, a broad embodiment of the invention is directed towards a metallic guard used in conjunction with a heating element of a portable immersible electric heater. This guard comprises in combination, a metallic band which defines an inside wall and an outside wall. Included with the guard are means for detachably locking the guard directly to the heating element. The detachable locking means and the band cooperatively defining means which may transfer heat from the heating element to the guard such that the overall heat transfer efficiency of the electric heater may be increased.

In a particular preferred embodiment, the guard includes means for supporting the heating element. The support means is attached to the inside wall of the band and may comprise tabs mounted to the band which extends perpendicularly inward toward the center of the band.

In another preferred embodiment the guard is adapted to detachably connect only to the heating element of the heater and to no other component of the heater. The detachable locking means comprises a crossbar attached to the band. The crossbar has clips attached to engage the heating element.

In still another embodiment the guard has a plurality of holes around the circumference of the band that allow fluid to pass to and from the heating element.

Yet in another preferred embodiment the band is circular and has a diameter greater than the vertical length of the wall of the band.

In another particularly preferred embodiment the guard is detachably connected to a heating element of a portable electric heater.

These as well as other objects and embodiments of the present invention will become evident from the following more detailed description of the invention.

DETAILED DESCRIPTION OF THE INVENTION

The present invention is directed towards a safety guard to be used in conjunction with a portable electric water heater. The use of such a guard will prevent damage that can be caused when the heating element of a heater comes into physical contact with the side of a water tank constructed of nonmetallic materials. In particular, tanks constructed of rubber, plastic, structural foam, and like materials are especially susceptible to thermal damage. The present invention effectively prevents the hot heating element of an electric heater from directly contacting the heat sensitive walls of these tanks. A further advantage of the present invention is the possible increase in the heat transfer area that is realized when the guard is used. This possible increase in heat transfer area causes the heat from the electric heater to dissipate more efficiently to surrounding water. The increase in heat transfer efficiency is possible because, unlike prior art guards, the guard of this invention is detachably connected directly to the heating element of the heater and is not thermally insulated from the heating element. As used herein, the terms "detachably connected", "detachably connected directly" and "detachably locking" are defined as meaning that the heating element of an electric heater is connected directly to the metallic guard absent any intermediate insulation or insulating material which would prevent direct physical contact of the heating element and the metallic guard.

Figure 1:
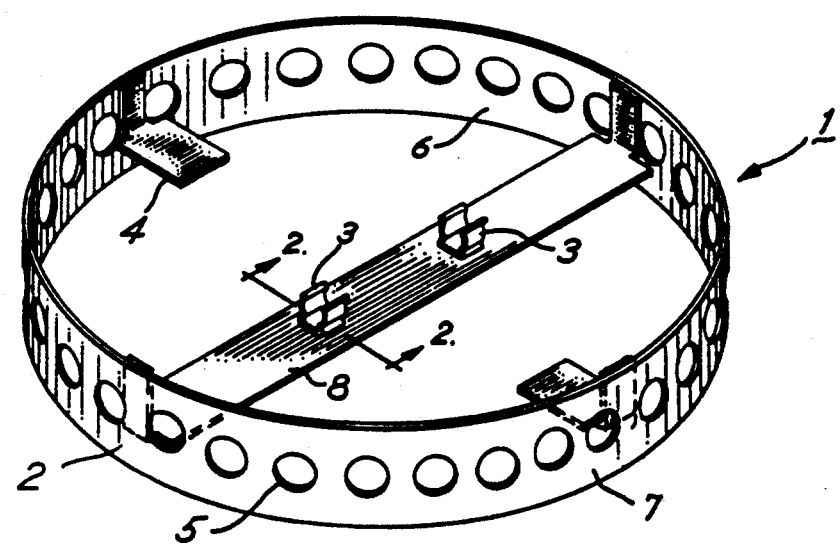
FIG. 1 is a perspective view of one embodiment of the invention.

In FIG. 1 a preferred embodiment of the invention is illustrated. Guard 1 is preferably constructed of metallic materials, most preferably of metals, such as aluminum, stainless steel, copper, tin, or the like. Of course, mixtures of these metals may also be used. Alternatively, any material that is relatively insensitive to heat, that has good heat transfer properties, and is not readily oxidized by an aqueous environment may be used. Stainless steel is the most preferred material of construction because it is the least prone to oxidation when used in a water environment.

The guard includes metallic band 2 having inside wall 6 and outside wall 7. Preferably the band is circular in shape. The diameter of the band is substantially greater in dimension than the vertical length of the outside wall, designated herein by "l". Preferably the diameter of the band, designated herein by "d", is at least twice as large as the vertical height, most preferably the ratio of d to l is at least 4:1. The requirement that the diameter be substantially greater than the vertical length of the outside wall is necessary in order to facilitate flotation of the electric heater when the guard is used in conjunction with a floating heater. When the guard is used with a submerged heater the ratio of d to l must be greater than 1:1 to allow the heater to lie flat on the bottom of the tank being heated.

Figure 3:
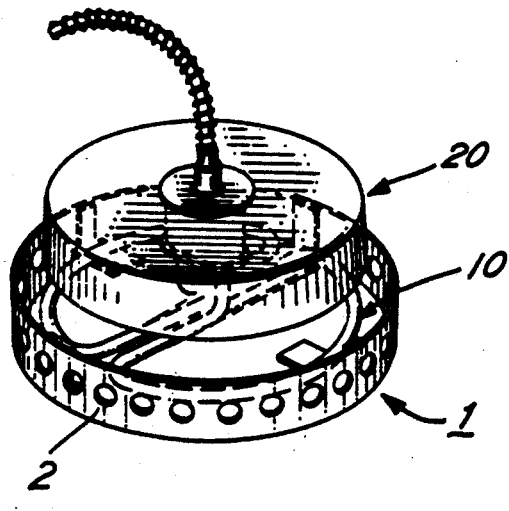
FIG. 3 is a perspective view of the metallic guard of the invention in use with a portable floating electric heater.
Figure 4:
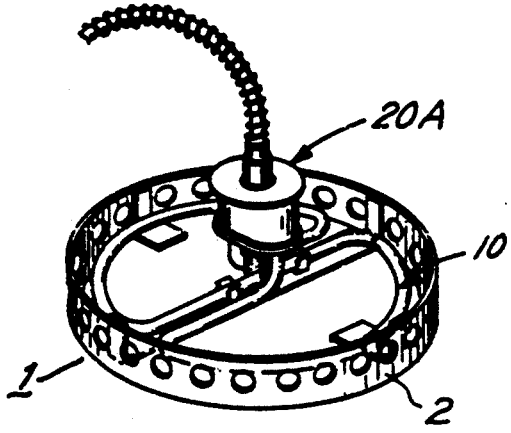
FIG. 4 is a perspective view of the metallic guard of the invention in use with a portable submerged electric heater.

In FIGS. 3 and 4 heating element 10 of portable floating electric heater 20 (FIG. 3) and portable submerged electric heater 20A (FIG. 4) is detachably connected directly to guard 1. The only points of contact between guard 1 and electric heater 20 or 20A is through heating element 10. No other component of electric heater 20 is in communication with guard 1.

Figure 2:
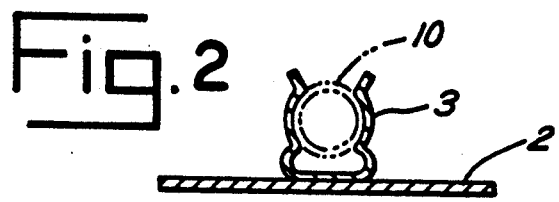
FIG. 2 is a cross section view of one embodiment of the invention showing in detail clips engaging a heating element of an electrical heater.

The metallic band provides means for detachably locking a heating element directly to the guard. The detachable locking means and the band cooperatively defines means for transferring heat from the heating element to the guard such that the overall heat transfer efficiency of a heater attached thereto is increased. FIG. 1 shows the detachable locking means comprising crossbar 8 attached to the inside wall of the band and positioned along the band's diameter. The crossbar provides structural support and prevents deformation of the band. Attached to the crossbar are clips 3 that are diametrically positioned along the cross bar. It is preferred that at least two clips be used. The clips are designed so that they engage the heating element of the electric heater and thereby hold the heater in a secured manner. The use of clips eliminates the need for screws or bolts, thus allowing the electric heater to be easily detached from the guard. A unique feature of the clips is that it allows for quick and easy attachment of the heater to the guard. FIG. 2 illustrates how the heating element of an electric heater is securely positioned within the clip. The design of the clips is such that the heating element is not easily removed, but some amount of force is needed to disengage the heating element from the clips. The detachability of the guard allows for easy cleaning and maintenance of the heater. Additionally, the detachability feature allows the guard to be readily retrofitted to electric heaters already manufactured and/or already in field use. Further, the clips serve to keep the heating element from direct contact with the crossbar. The clips provide a point of contact between the guard and the heating element of the heater that enables the guard to conduct heat and thereby possibly increase the overall heat transfer efficiency of the electric heater.

To provide further support and to provide additional contact area for heat transfer, the guard has means for supporting a heating element. Preferably the support means comprises tabs 4 that are mounted to the inside wall of the band. These tabs extend perpendicularly inward from the inside wall toward the center of the band and are diametrically positioned. The tabs are in direct contact with the heating element of the heater allowing heat to be directly conducted to the band. The vertical position of the tabs along the length of the inside wall of the band varies depending on the particular size and shape of the heating element that the tabs are to support.

As mentioned, the guard not only serves as a safety and protection device, it further may increase the overall heat transfer efficiency of the electric heater that it is used in conjunction with. Because the heating element is in direct contact with the detachable locking means and the supporting means, the cross bar as well as the circular band will conduct heat from the heating element. However, because the points of contact are limited to relatively small areas, the guard will not reach a temperature high enough to cause thermal damage to a nonmetallic tank wall. The conduction of heat by the guard may serve to increase the total available heat transfer area. Another feature that may increase heat transfer efficiency is a plurality of holes 5 located along the circumference of the band. These holes may increase the efficiency of heat transfer from both the heater and the guard itself, allowing water to readily egress and ingress from the outside and inside walls of the band. A sufficient number of holes of a large enough size are needed so that the guard when used with a floating heater, will not inhibit floatation and movement of the heater on the surface of a body of water.

What is claimed:

1. A metallic guard for use with a heating element of a portable electric immersion heater comprising, in combination:

an endless metallic band defining an inner periphery and a central area inwardly of the inner periphery, said band adapted to receive a heating element wherein the inner periphery of the band is spaced from the heating element; and means for detachably locking the band directly to a heating element, said locking means comprising a crossbar attached to the band and extending across the central area and clips positioned along the crossbar to engage the heating element, said clips adapted to attach only to the heating element and to no other component of the heater, the clips are further characterized in that they allow easy attachability and detachability;

the locking means and the metallic band cooperatively defining means adapted to inhibit the heating element of a portable electric heater from coming into direct contact with an adjacent surface.

2. The metallic guard of claim 1 further characterized in that the band defines openings about its outer periphery whereby fluids can pass through said openings.

3. The metallic guard of claim 1 further characterized in that the guard includes support means adapted to support the heating element, the support means operatively attached to the metallic band to allow association with said heating element.

4. The support means of claim 3 further characterized in that the support means comprises at least two tabs operatively mounted to the metallic band extending inward toward the center of the band.

5. The metallic guard of claim 1 further characterized in that the band is circular and defines a vertical height whereby the diameter of said band is greater than the vertical height.

* * * * *